United States Patent
Zhang et al.

(10) Patent No.: US 12,418,381 B2
(45) Date of Patent: Sep. 16, 2025

(54) BEAM INDICATION FOR INTER-CELL MULTIPLE TRANSMISSION AND RECEPTION (MULTI-TRP, MTRP) OPERATION

(71) Applicant: APPLE INC., Cupertino, CA (US)

(72) Inventors: Yushu Zhang, Beijing (CN);
Chunxuan Ye, San Diego, CA (US);
Dawei Zhang, Saratoga, CA (US);
Haitong Sun, Cupertino, CA (US);
Hong He, San Jose, CA (US); Seyed Ali Akbar Fakoorian, San Diego, CA (US); Sigen Ye, San Diego, CA (US);
Wei Zeng, Saratoga, CA (US);
Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,236

(22) PCT Filed: Sep. 24, 2021

(86) PCT No.: PCT/CN2021/120461
§ 371 (c)(1),
(2) Date: Aug. 29, 2022

(87) PCT Pub. No.: WO2023/044806
PCT Pub. Date: Mar. 30, 2023

(65) Prior Publication Data
US 2024/0235780 A1 Jul. 11, 2024

(51) Int. Cl.
*H04L 5/00* (2006.01)
*H04W 72/1273* (2023.01)
*H04W 74/0833* (2024.01)

(52) U.S. Cl.
CPC ....... *H04L 5/0053* (2013.01); *H04W 72/1273* (2013.01); *H04W 74/0833* (2013.01)

(58) Field of Classification Search
CPC ... H04L 5/0053; H04L 5/0023; H04L 5/0035; H04L 5/005; H04L 5/001;
(Continued)

(56) References Cited

U.S. PATENT DOCUMENTS

2019/0140776 A1* 5/2019 Seo ................ H04B 7/0456
2020/0350957 A1 11/2020 Zhou et al.
(Continued)

FOREIGN PATENT DOCUMENTS

CN 113259952 A 8/2021

OTHER PUBLICATIONS

Apple Inc., "On Beam Management Enhancement", R1-2006499, 3GPP TSG-RAN WG1 Meeting #102-e, e-Meeting, Agenda Item 8.1.1, Aug. 17-20, 2020, 10 pages.
(Continued)

*Primary Examiner* — Kan Yuen
(74) *Attorney, Agent, or Firm* — Dorsey & Whitney LLP

(57) ABSTRACT

To support inter-cell multi-TRP operation, disclosed are embodiments that provide a beam indication for the common signals, e.g., signals transmitted and scheduled by some CSS. The disclosed embodiments provide inter-cell multi-TRP with or without serving cell change. In addition, some embodiments provide for switching between inter-cell multi-TRP and intra-cell multi-TRP.

14 Claims, 9 Drawing Sheets

(58) Field of Classification Search
CPC ......... H04W 72/1273; H04W 74/0833; H04W 76/15; H04B 7/0617; H04B 7/06968; H04B 7/022
See application file for complete search history.

(56) References Cited

U.S. PATENT DOCUMENTS

| | | | |
|---|---|---|---|
| 2022/0322310 A1* | 10/2022 | Laddu | H04W 72/23 |
| 2022/0408383 A1* | 12/2022 | Kurita | H04L 5/005 |
| 2022/0417909 A1* | 12/2022 | Zhu | H04W 16/28 |
| 2023/0163914 A1* | 5/2023 | Koskela | H04W 24/08 |
| | | | 370/242 |
| 2023/0164800 A1* | 5/2023 | Khoshnevisan | H04L 5/0035 |
| | | | 370/329 |
| 2023/0188293 A1* | 6/2023 | Liu | H04W 56/0015 |
| | | | 370/329 |
| 2024/0040589 A1* | 2/2024 | Wu | H04W 72/232 |
| 2024/0235783 A1* | 7/2024 | Matsumura | H04L 5/0094 |

OTHER PUBLICATIONS

Moderator (Samsung), "Moderator summary for multi-beam enhancement: proposal categorization", R1-2006985, 3GPP TSG RAN WG1 #102-e, e-Meeting, Agenda Item 8.1.1, Aug. 17-28, 2020, 27 pages.

OPPO, "Enhancements on beam management for multi-TRP", R1-2005986, 3GPP TSG RAN WG1 #102-e, e-Meeting, Agenda Item 8.1.2.3, Aug. 17-28, 2020, 3 pages.

PCT/CN2021/120461, International Search Report and Written Opinion, Apr. 25, 2022, 9 pages.

Mediatek Inc., "Enhancement on multi-beam operation", R1-2107485, 3GPP TSG RAN WG1 #106-e, e-Meeting, Agenda Item 8.1.1, Aug. 16-27, 2021, 37 pages.

Nokia, Nokia Shanghai Bell, "Enhancements on Multi-beam Operation", R1-2108052, 3GPP TSG RAN WG1 #106-e, e-Meeting, Agenda Item 8.1.1, Aug. 16-27, 2021, 30 pages.

ZTE, "Enhancements on Multi-beam Operation", R1-2106541, 3GPP TSG RAN WG1 Meeting #106-e, e-Meeting, Agenda Item 8.1.1, Aug. 16-27, 2021, 24 pages.

* cited by examiner

```
PDCCH-ConfigCommon ::=         SEQUENCE {
    controlResourceSetZero             ControlResourceSetZero                              OPTIONAL,   -- Cond InitialBWP-Only
    commonControlResourceSet           ControlResourceSet                                  OPTIONAL,   -- Cond R
    searchSpaceZero                    SearchSpaceZero                                     OPTIONAL,   -- Cond InitialBWP-Only
    commonSearchSpaceList              SEQUENCE (SIZE (1..4)) OF SearchSpace               OPTIONAL,   -- Need R
    searchSpaceSIB1                    SearchSpaceId                                       OPTIONAL,   -- Need S
    searchSpaceOtherSystemInformation  SearchSpaceId                                       OPTIONAL,   -- Need S
    pagingSearchSpace                  SearchSpaceId                                       OPTIONAL,   -- Need S
    ra-SearchSpace                     SearchSpaceId                                       OPTIONAL,   -- Need S
    ...,
    [[
    firstPDCCH-MonitoringOccasionOfPO  CHOICE {
        sCS15KHZoneT                                                     SEQUENCE (SIZE (1..maxPO-perPF)) OF INTEGER (0..139),
        sCS30KHZoneT-SCS15KHZhalfT                                       SEQUENCE (SIZE (1..maxPO-perPF)) OF INTEGER (0..279),
        sCS60KHZoneT-SCS30KHZhalfT-SCS15KHZquarterT                      SEQUENCE (SIZE (1..maxPO-perPF)) OF INTEGER (0..559),
        sCS120KHZoneT-SCS60KHZhalfT-SCS30KHZquarterT-SCS15KHZoneEighthT  SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT SEQUENCE (SIZE (1..maxPO-perPF)) OF INTEGER (0..2239),
        sCS120KHZquarterT-SCS60KHZoneEighthT-SCS30KHZoneSixteenthT       SEQUENCE (SIZE (1..maxPO-perPF)) OF INTEGER (0..4479),
        sCS120KHZoneEighthT-SCS60KHZoneSixteenthT                        SEQUENCE (SIZE (1..maxPO-perPF)) OF INTEGER (0..8959),
        sCS120KHZoneSixteenthT                                           SEQUENCE (SIZE (1..maxPO-perPF)) OF INTEGER (0..17919)
    }                                                                                       OPTIONAL    -- Cond OtherBWP
    ]],
    [[
    commonSearchSpaceListExt-r16       SEQUENCE (SIZE(1..4)) OF SearchSpaceExt-r16         OPTIONAL    --
    ]]
}

PDSCH-ConfigCommon ::=         SEQUENCE {
    pdsch-TimeDomainAllocationList     PDSCH-TimeDomainResourceAllocationList              OPTIONAL,   -- Need R
    ...
}
```

502 points to PDCCH-ConfigCommon
504 points to PDSCH-ConfigCommon

FIG. 5

```
PUSCH-ConfigCommon ::=         SEQUENCE {
    groupHoppingEnabledTransformPrecoding    ENUMERATED {enabled}                              OPTIONAL,    -- Need R
    pusch-TimeDomainAllocationList           PUSCH-TimeDomainResourceAllocationList            OPTIONAL,    -- Need R
    msg3-DeltaPreamble                       INTEGER (-1..6)                                   OPTIONAL,    -- Need R
    p0-NominalWithGrant                      INTEGER (-202..24)                                OPTIONAL,    -- Need R
    ...
}

PUCCH-ConfigCommon ::=         SEQUENCE {
    pucch-ResourceCommon                     INTEGER (0..15)                                   OPTIONAL,    -- Cond InitialBWP-Only
    pucch-GroupHopping                       ENUMERATED { neither, enable, disable },
    hoppingId                                INTEGER (0..1023)                                 OPTIONAL,    -- Need R
    p0-nominal                               INTEGER (-202..24)                                OPTIONAL,    -- Need R
    ...
}
```
(602 points to PUSCH-ConfigCommon; 604 points to PUCCH-ConfigCommon)

FIG. 6

```
RACH-ConfigCommon ::=            SEQUENCE {
    rach-ConfigGeneric               RACH-ConfigGeneric,
    totalNumberOfRA-Preambles        INTEGER (1..63)                                                          OPTIONAL,    -- Need S
    ssb-perRACH-OccasionAndCB-PreamblesPerSSB  CHOICE {
        oneEighth                        ENUMERATED {n4,n8,n12,n16,n20,n24,n28,n32,n36,n40,n44,n48,n52,n56,n60,n64},
        oneFourth                        ENUMERATED {n4,n8,n12,n16,n20,n24,n28,n32,n36,n40,n44,n48,n52,n56,n60,n64},
        oneHalf                          ENUMERATED {n4,n8,n12,n16,n20,n24,n28,n32,n36,n40,n44,n48,n52,n56,n60,n64},
        one                              ENUMERATED {n4,n8,n12,n16,n20,n24,n28,n32,n36,n40,n44,n48,n52,n56,n60,n64},
        two                              ENUMERATED {n4,n8,n12,n16,n20,n24,n28,n32},
        four                             INTEGER (1..16),
        eight                            INTEGER (1..8),
        sixteen                          INTEGER (1..4)
    }                                                                                                         OPTIONAL,    -- Need M
    groupBconfigured                 SEQUENCE {
        ra-Msg3SizeGroupA                ENUMERATED {b56, b144, b208, b256, b282, b480, b640,
                                                     b800, b1000, b72, spare6, spare5, spare4, spare3, spare2, spare1},
        messagePowerOffsetGroupB         ENUMERATED { minusinfinity, dB0, dB5, dB8, dB10, dB12, dB15, dB18},
        numberOfRA-PreamblesGroupA       INTEGER (1..64)
    }                                                                                                         OPTIONAL,    -- Need R
    ra-ContentionResolutionTimer     ENUMERATED { sf8, sf16, sf24, sf32, sf40, sf48, sf56, sf64},
    rsrp-ThresholdSSB                INTEGER (0..837),                                                        OPTIONAL,    -- Need R
    rsrp-ThresholdSSB-SUL            INTEGER (0..137),                                                        OPTIONAL,    -- Cond SUL
    prach-RootSequenceIndex          CHOICE {
        l839                             INTEGER (0..837),
        l139                             INTEGER (0..137)
    },
    msg1-SubcarrierSpacing           SubcarrierSpacing                                                        OPTIONAL,    -- Cond L139
    restrictedSetConfig              ENUMERATED {unrestrictedSet, restrictedSetTypeA, restrictedSetTypeB},
    msg3-transformPrecoder           ENUMERATED {enabled}                                                     OPTIONAL,    -- Need R
    ...,
    [[
    ra-PrioritizationForAccessIdentity-r16  SEQUENCE {
        ra-Prioritization-r16            RA-Prioritization,
        ra-PrioritizationForAI-r16       BIT STRING (SIZE (2))
    }                                                                                                         OPTIONAL,    -- Cond InitialBWP-Only
    ]],
    prach-RootSequenceIndex-r16      CHOICE {
        l571                             INTEGER (0..569),
        l1151                            INTEGER (0..1149)
    }                                                                                                         OPTIONAL     -- Need R
}
```

FIG. 7

BEAM INDICATION FOR INTER-CELL MULTIPLE TRANSMISSION AND RECEPTION (MULTI-TRP, MTRP) OPERATION

TECHNICAL FIELD

This application relates generally to wireless communication systems, including inter-cell mTRP.

BACKGROUND OF THE DISCLOSURE

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a table showing a definition of PDCCH-ConfigCommon and PDSCH-ConfigCommon, according to embodiments disclosed herein.

FIG. 6 is a table showing a definition of PUCCH-ConfigCommon, according to embodiments disclosed herein.

FIG. 7 is a table showing a definition of RACH-ConfigCommon, according to embodiments disclosed herein.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
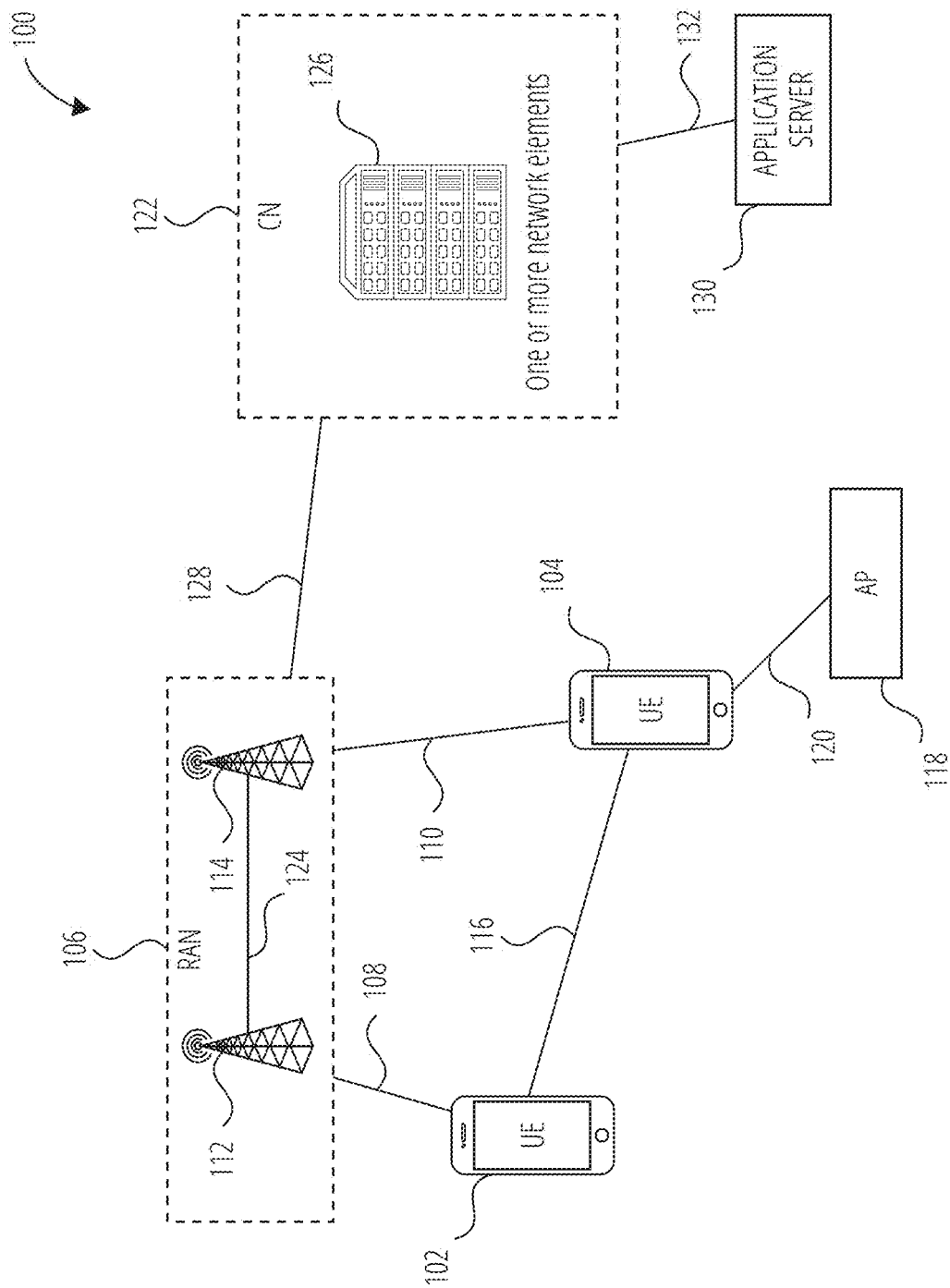
FIG. 1 is a block diagram showing an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, wireless communication system 100 includes UE 102 and UE 104 (although any number of UEs may be used). In this example, UE 102 and UE 11.4 are illustrated as smartphones (e.g., handheld touchscreen mobile computing devices connectable to one or more cellular networks), but may also comprise any mobile or non-mobile computing device configured for wireless communication.

UE 102 and UE 104 may be configured to communicatively couple with a RAN 106. In embodiments, RAN 106 may be NG-RAN, E-UTRAN, etc. UE 102 and UE 104 utilize connections (or channels) (shown as connection 108 and connection 110, respectively) with RAN 106, each of which comprises a physical communications interface. RAN 106 can include one or more base stations, such as base station 112 and base station 114, that enable connection 108 and connection 110.

In this example, connection 108 and connection 110 are air interfaces to enable such communicative coupling, and may be consistent with RAT(s) used by RAN 106, such as, for example, an LTE and/or NR.

In some embodiments, UE 102 and UE 104 may also directly exchange communication data via a sidelink interface 116. UE 104 is shown to be configured to access an access point (shown as AP 118) via connection 120. By way of example, connection 120 can comprise a local wireless connection, such as a connection consistent with any IEEE 402.11 protocol, wherein AP 118 may comprise a Wi-Fi® router. In this example, AP 118 may be connected to another network (for example, the Internet) without going through a CN 122.

In embodiments, UE 102 and UE 104 can be configured to communicate using orthogonal frequency division multiplexing (OFDM) communication signals with each other or with base station 112 and/or base station 114 over a multi-carrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of base station 112 or base station 114 may be implemented as one or more software entities running on server computers as part of a virtual network. In addition, or in other embodiments, base station 112 or base station 114 may be configured to communicate with one another via interface 124. In embodiments where wireless communication system 100 is an LTE system (e.g., when CN 122 is an EPC), interface 124 may be an X2 interface. The X2 interface may be defined between two or more base stations (e.g., two or more eNBs and the like) that connect to an EPC, and/or between two eNBs connecting to the EPC. In embodiments where wireless communication system 100 is an NR system (e.g., when CN 122 is a 5GC), interface 124 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 122).

RAN 106 is shown to be communicatively coupled to CN 122. CN 122 may comprise one or more network elements 126, which are configured to offer various data and telecommunications services to customers/subscribers (e.g., users of UE 102 and UE 104) who are connected to CN 122 via RAN 106. The components of CN 122 may be implemented in one physical device or separate physical devices including components to read and execute instructions from a machine-readable or computer-readable medium (e.g., a non-transitory machine-readable storage medium).

In embodiments, CN 122 may be an EPC, and RAN 106 may be connected with CN 122 via an S1 interface 128. In embodiments, S1 interface 128 may be split into two parts, an S1 user plane (S1-U) interface, which carries traffic data between base station 112 or base station 114 and a serving gateway (S-GW), and the S1-MME interface, which is a signaling interface between base station 112 or base station 114 and mobility management entities (MMEs).

In embodiments, CN 122 may be a 5GC, and RAN 106 may be connected with CN 122 via an NG interface 128. In embodiments, NG interface 128 may be split into two parts, an NG user plane (NG-U) interface, which carries traffic data between base station 112 or base station 114 and a user plane function (UPF), and the S1 control plane (NG-C) interface, which is a signaling interface between base station 112 or base station 114 and access and mobility management functions (AMFs).

Generally, an application server 130 may be an element offering applications that use internet protocol (IP) bearer resources with CN 122 (e.g., packet switched data services).

Application server 130 can also be configured to support one or more communication services (e.g., VoIP sessions, group communication sessions, etc.) for UE 102 and UE 104 via CN 122. Application server 130 may communicate with CN 122 through an IP communications interface 132.

Downlink control information (DCI) in 5G/NR has a purpose that is the same as that of DCI in LTE. That is. DCI is a set of information which schedules downlink data channel (e.g., physical downlink shared channel. PDSCH) or uplink data channel (e.g., physical uplink shared channel, PUSCH).

Physical downlink control channel (PDCCH) search space refers to the area in the downlink resource grid where PDCCH may be carried. A UE performs blind decoding throughout these search space trying to find PDCCH data (i.e., DCI). In order for UE to decode PDCCH (DCI), it determines the exact value for location, structure, scrambling code, and etc. This information is not informed to UE beforehand and in most cases the values change dynamically. The only thing known to UE is the information about a certain range that possibly carries PDCCH (DCI). The UE performs blind decoding in a predefined region. The predefined region in which UE perform the blind decoding is called a search space.

There are two types of search space called a UE-specific search space (USS) and a common search space (CSS). The USS is dedicated for each specific UE and informed to UE via RRC signaling message. It means UE needs to complete RRC establishment to get the information about the USS. The common search space (CSS) is the search space that every UE or group of UEs (group casts) needs to search for the signals for every UE (e.g., PDCCH for SIB) or signaling message that is applied to every UE before dedicated channel is established for a specific UE (e.g., PDCCH used during RACH process). For example, a UE needs to detect PDCCH for SIB1 reception or various DCI (PDCCH) during RACH process (e.g., DCI for Msg2/Msg4 reception).

In Release 16 of the 3GPP standards (Rel-16), intra-cell multi-TRP operation has been supported with two modes: single- and multi-DCI modes. Single-DCI mode is when a gNB can schedule PDSCH from two TRPs by a single DCI. Multi-DCI mode is when PDSCH from two TRPs are scheduled by two DCIs. The two DCIs are transmitted in control resource sets (CORESETs) with different CORESETPoolIndex.

The gNB can provide beam indication, e.g., transmission configuration indicator (TCI) indication, for CORESET and PDSCH based on channel state information reference signal (CSI-RS). A synchronization signal block (SSB) can be indicated as the quasi-co-location (QCL) source for the CSI-RS in its TCI source.

SS/CORESET 0 is a special SS/CORESET, in which each instance is associated with an SSB. PDCCH beam, time/frequency location are determined by the associated SSB.

A UE need not monitor all instances for SS/CORESET 0. Instead, a UE would monitor the SS/CORESET 0 instance associated with one SSB from the most recent of the following: SSB associated with RACH procedure or SSB QCLed with the CSI-RS in the TCI state for the CORESET 0.

In terms of search space configuration, there is a total of six types of search spaces. There are five types of CSS and one type of USS.

CSS includes the following types described under section 10.1 of 3GPP 38.213: Type0-PDCCH CSS set; Type0A-PDCCH CSS set; Type1-PDCCH CSS set; Type2-PDCCH CSS set; and Type3-PDCCH CSS set. For CSS, some common signals are transmitted or scheduled by some CSS. A common signals is one that is received by multiple UEs, for example, PDCCH transmitted in CSS sets not associated with cell radio network temporary identifier (RNTI) (C-RNTI), modulation coding scheme (MCS)C-RNTI (MCS-C-RNT), as well as corresponding PDSCH scheduled by the PDCCH.

Type0-PDCCH CSS set is configured by pdcch-ConfigSIB1 in MIB or by searchSpaceSIB1 in PDCCH-Config-Common or by searchSpaceZero in PDCCH-ConfigCommon for a DCI format with cyclic redundancy check (CRC) scrambled by a system information (SI) radio network temporary identifier (RNTI) (SI-RNTI) on the primary cell of the master cell group (MCG).

Type0A-PDCCH CSS set is configured by searchSpaceOtherSystemInformation in PDCCH-ConfigCommon for a DCI format with CRC scrambled by a SI-RNTI on the primary cell of the MCG.

Type1-PDCCH CSS set is configured by ra-SearchSpace in PDCCH-ConfigCommon for a DCI format with CRC scrambled by a random access (RA) RNTI (RA-RNTI), a MsgB-RNTI, or a temporary cell (TC) RNTI (TC-RNTI) on the primary cell.

Type2-PDCCH CSS set is configured by pagingSearchSpace in PDCCH-ConfigCommon for a DCI format with CRC scrambled by a paging RNTI (P-RNTI) on the primary cell of the MCG.

Type3-PDCCH CSS set is configured by SearchSpace in PDCCH-Config with searchSpaceType=common for DCI formats with CRC scrambled by interruption RNTI (INT-RNTI), slot format indication (SFI) RNTI (SFI-RNTI), transmit power control (TPC) PUSCH RNTI (TPC-PUSCH-RNTI), TPC-PUCCH RNTI, TPC sounding reference symbols (SRS) RNTI (TPC-SRS-RNTT), or cancellation indication (CI) RNTI (CI-RNTI) and, only for the primary cell, C-RNTI, MCS-C-RNTI, configured scheduling (CS) RNTI(s) (CS-RNTI), or power saving (PS) RNTI (PS-RNTI).

USS is for some dedicated transmission. For instance, a dedicated signal is a PDCCH associated with a C-RNTI/MCS-C-RNTI or a PDSCH scheduled by DCI with C-RNTI/MCS-C-RNTI.

Figure 2:
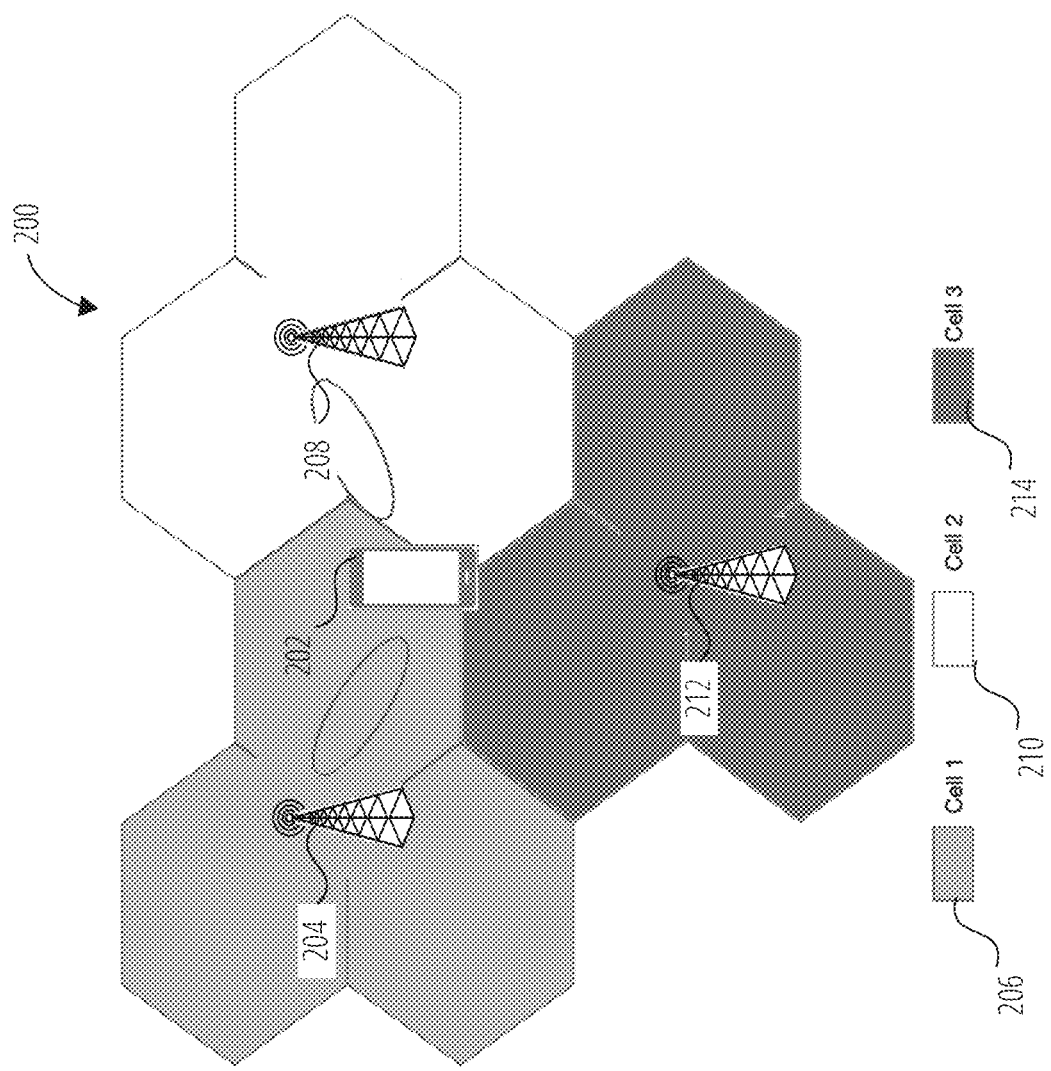
FIG. 2 is a block diagram showing multiple cells for inter-cell mTRP, according to embodiments disclosed herein.

In Release 17 of the 3GPP standards (Rel-16), the multi-DCI operation is to be enhanced to support inter-cell operation, as shown in FIG. 2. FIG. 2 is a diagram of inter-cell multi-TRP 200 in which a UE 202 is connected to a first gNB 204 acting a first cell 206 and a second gNB 208 acting as a second cell 210. A third gNB 212 providing a third cell 214 is also available.

In inter-cell multi-TRP 200, a PDSCH can be transmitted from different cells with different cell ID. SSB pattern in different cells could be the same or different. SSBs from different cells may be multiplexed in the same symbols. The PDSCH from different cells may be overlapped in time/frequency domain. Accordingly, an issue in supporting inter-cell multi-TRP operation is how to provide the beam indication for the common signals, e.g., signals transmitted and scheduled by the CSS. In particular, the issue arises in the following two cases. A first case is inter-cell multi-TRP without a serving cell change. A second case is inter-cell multi-TRP with a serving cell change. In addition, a related issue is how to support switching between inter-cell multi-TRP and intra-cell multi-TRP, which should also consider the two cases.

In the first case (without serving cell change), the common signal is QCLed with one of the SSB associated with the serving cell physical cell ID (PCI). A serving cell is the cell where UE decoded the master information block (MIB). In some embodiments, there are two options described as follows.

A first option is when the CORESETs are divided into two groups. A first group (group 1) includes CORESETs associated with some or all just CSS, or at least associated with some or all CSS. It may include Type 0/0A/1/2 CSS or all CSS. The TCI state associated with serving cell PCI can be used for beam indication. As an extension, the QCL assumption for these CORESETs can also be updated by SSB associated with some random access procedure, e.g., in response to the UE sending to the gNB a physical random access channel (PRACH) associated with SSB in contention-based random access (CBRA). A second group (group 2) includes CORESETs associated with a USS and optionally Type 3 CSS. For this second group, the TCI state associated with a PCI from the assistant cell can be used for beam indication because dedicated signal can still be transmitted from assistant cells. An assistant cell is the cell that can communicate with the UE in inter-cell multi-TRP mode.

The PDSCH scheduled by CORESETs in group 1 can share the same beam as the CORESETs. When the UE decodes the PDSCH corresponding to the CORESETs in group 1, it can prioritize the beam to receive such PDSCH, regardless of whether there is another PDSCH scheduled by CORESETs in group 2 or not. In one example, group 1 may only include CORESET 0.

A second option is when the TCI indication is not applied for some or all CSS. In one example, TCI indication is not applied for Type 0/0A/1/2 CSS. In another example, the TCI indication is not applied for all CSS. The QCL assumption for the precluded CSS can be updated by SSB associated with some random access procedure, e.g., contention-based random access (CBRA). The PDSCH scheduled by the precluded CSS can share the same beam as the precluded CSS, meaning both common PDCCH and PDSCH are based on the same beam from serving cell. When the UE decodes the PDSCH corresponding to the CSS, it can prioritize the beam to receive such PDSCH, regardless of whether there is another PDSCH scheduled by another search space or not.

With regard to switching between inter-cell mTRP and intra-cell mTRP, all the CORESETPoolIndex should only be associated with the serving cell PCI when UE is switched to intra-cell mTRP. When UE is switched to inter-cell mTRP, at least one CORESETPoolIndex should be associated with the serving cell PCI and different CORESETPoolIndex should be associated with different PCIs. Association between CORESETPoolIndex and PCI indicates that signals scheduled or transmitted from CORESET with a CORESETPoolIndex should be QCLed directly or indirectly with SSBs with the PCI.

Figure 3:
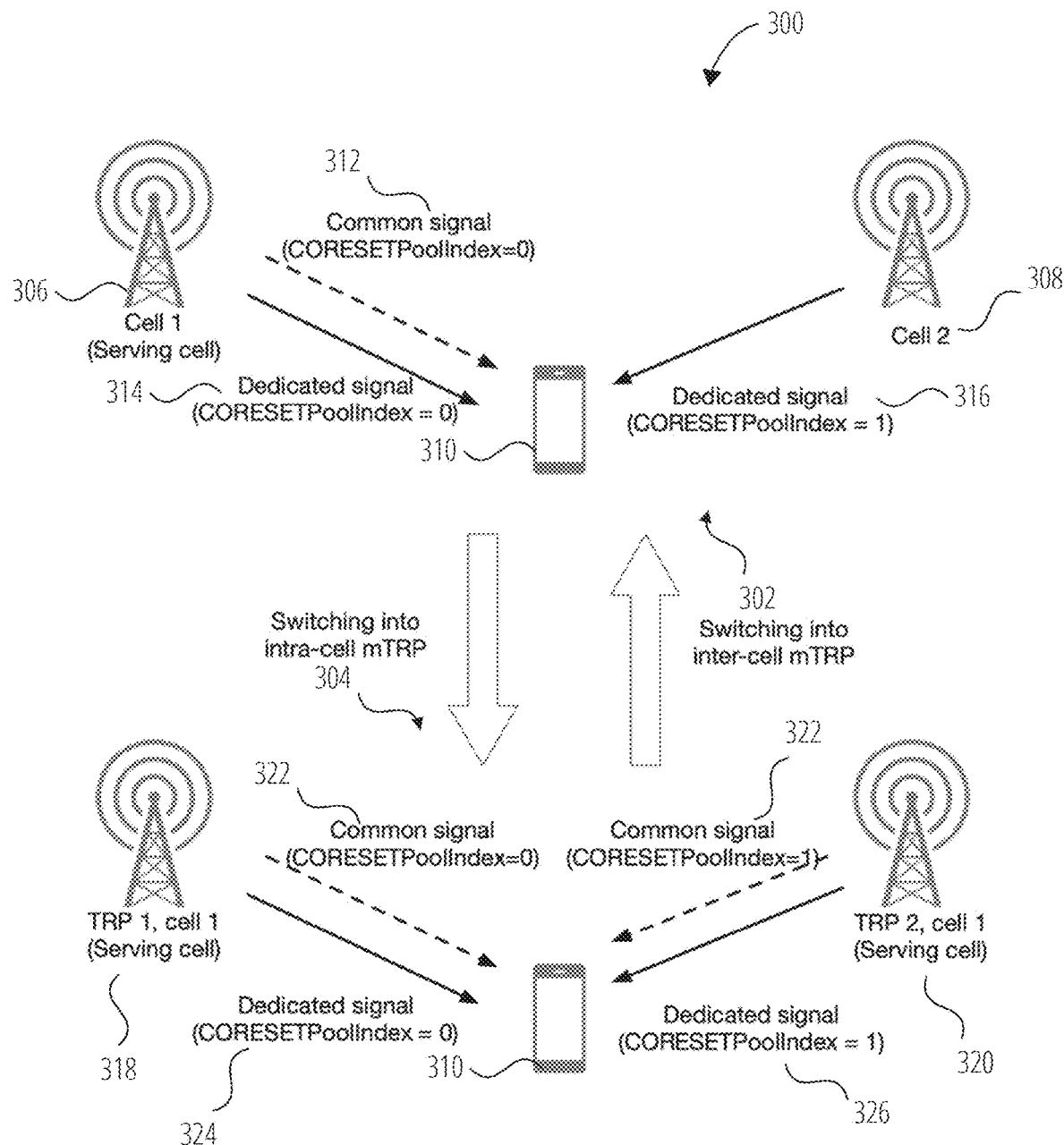
FIG. 3 is a block diagram showing switching between intra-cell mTRP and intra-cell mTRP, according to embodiments disclosed herein.

FIG. 3 shows an example of mTRP 300 for dynamic cell switching and QCL configuration without serving cell change. An upper portion of FIG. 3 shows inter-cell mTRP 302. A lower portion of FIG. 3 shows intra-cell mTRP 304.

Inter-cell mTRP 302 includes a first cell 306, a second cell 308, and a UE 310. First cell 306 is assumed to be a serving cell for UE 310. Common signal 312 comes from CORESETPoolIndex zero, which is associated with first cell 306. First cell 306 provides a dedicated signal 314. Second cell 308 provides dedicated signal 316.

When UE 310 switches to intra-cell mTRP 304, there are two TRPs in a first cell. Specifically, intra-cell mTRP 304 includes a first TRP 318, a second TRP 320, and UE 310 in a cell. Accordingly, a common signal 322 can come from any CORESETPoolIndex (e.g., zero or one), associated with the same PCI. A dedicated signal 324 and a dedicated signal 326 can still come from both first TRP 318 and second TRP 320.

Figure 4:
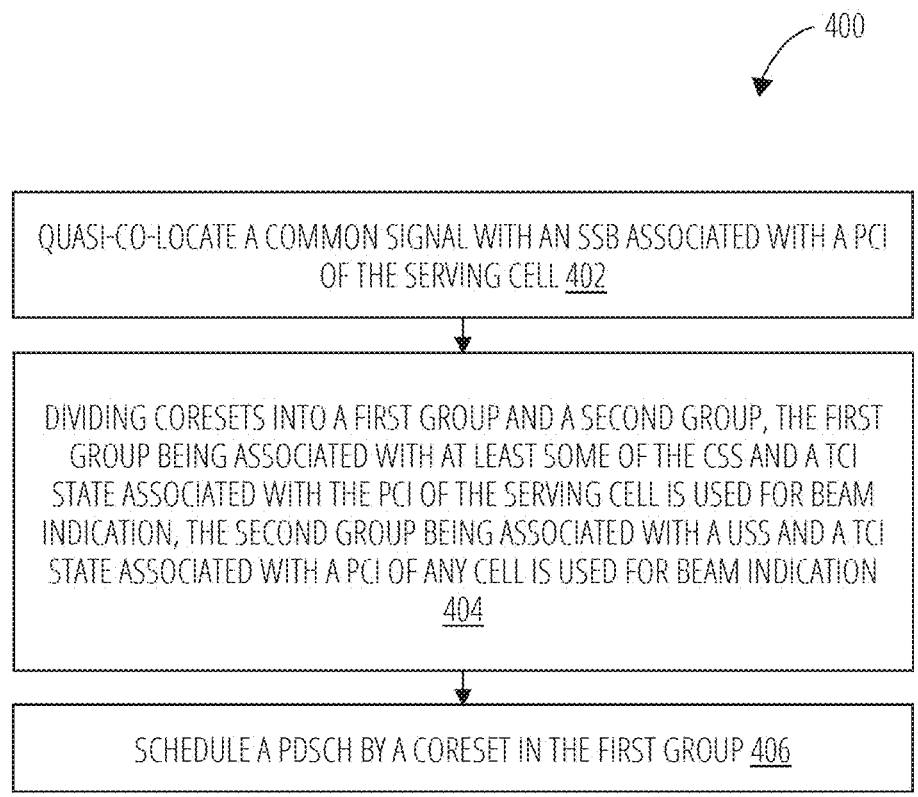
FIG. 4 is a flow diagram of a process, in accordance with one embodiment.

FIG. 4 shows a process 400, performed by a gNB defining a serving cell, of providing to a UE a beam indication for common signals transmitted and scheduled by a CSS for inter-cell multi-TRP operation without a change of the serving cell. In block 402, process 400 quasi-co-locates a common signal with an SSB associated with a PCI of the serving cell. In block 404, process 400 dividing CORESETs into a first group and a second group, the first group being associated with at least some of the CSS and a TCI state associated with the PCI of the serving cell is used for beam indication, the second group being associated with a USS and a TCI state associated with a PCI of any cell (i.e., serving cell or assistant cells(s)) is used for beam indication. In block 406, process 400 schedules a PDSCH by a CORESET in the first group. Process 400 may also include the first group comprised of type 0, type 0A, type 1, type 2 CSS, or all types of CSS. And in some embodiments, the second group includes a type 3 CSS. In another embodiment, the first group includes only CORESET 0. Process 400 may also include, in response to the UE sending to the gNB a PRACH associated with the SSB, updating a quasi-co-location for the first group. Process 400 may also include the PDSCH being scheduled by a PDCCH in CORESETs in the first or second groups and having a same beam with CORESETs in the first or second groups. Process 400 may also include, in response to the UE switching from intra-cell multi-TRP, associating a CORESETPoolIndex with the PCI of the serving cell.

When serving cell change is allowed, the common signal is QCLed with one of the SSB associated with PCI other than serving cell PCI. There are three options for this embodiment.

A first option is that some of or all the parameters present in common configuration under section 6.3.2 of 3GPP 38.331 for the associated cell, e.g., PDCCH-ConfigCommon 502 (FIG. 5), PDSCH-ConfigCommon 504 (FIG. 5), PUSCH-ConfigCommon 602 (FIG. 6), PUCCH-ConfigCommon 604 (FIG. 6), and RACH-ConfigCommon 702 (FIG. 7) can be provided by RRC signaling. When the common signals are associated with the assistant cell PCI, a UE should use the corresponding configuration to receive or transmit the common signal. As an extension, the common signals may be associated with one cell at a time. The options described above (first option is when the CORESETs are divided into two groups; a second option is when the TCI indication is not applied for some or all CSS) may be reused for beam indication, where the indicated beam for the common signal can be associated with one cell.

A second option is when UE assumes the common configuration for assistant cell and serving cell are the same.

A third option is a mix of the first and second options. For instance, the gNB can optionally provide configuration based on the first option for a cell. If the configuration is not provided, UE assumes the configuration for the cell is the same as serving cell.

If a UE communicates with a single cell, e.g., the UE receives or transmits common signal to one cell, and has a serving cell change, then radio resource management (RRM) should consider this cell as the new serving cell. All the measurement events, e.g., event A1-A6 of section 5.5.4 in 3GPP 38.331 should consider the new serving cell measurement results.

If a UE communicates with more than one cells, e.g., UE receive or transmit common signal to more than one cells, and has a serving cell change, then there are three options for RRM.

A first option is that the RRM considers one cell as serving cell. The cell may be configured by higher layer signaling, e.g., RRC or MAC CE, or predefined. An example of a predefined serving cell is a cell with lowest PCI or cell associated with CORESET with lowest ID or cell associated with CORESETPoolIndex equal to zero.

A second option is that the RRM considers all the cells as serving cells. The event A1-A6 considers the minimal/maximum/average measurement results from all the cells.

A third option is that the RRM procedure can be extended as a per CORESETPoolIndex procedure. The event A1-A6 can be applied per CORESETPoolIndex to assist gNB to make the decision for cell change for a CORESETPoolIndex.

With serving cell change, a gNB may configure the C-RNTI and/or MCS-C-RNTI for the new cell by higher layer signaling, e.g., RRC or MAC CE. If a UE communicates with a single cell, e.g., UE only receive or transmit common signal to one cell, UE should apply the C-RNTI/MCS-C-RNTI associated with the cell for communication. If a UE communicates with more than one cells, e.g., UE receive or transmit common signal to more than one cells, there are two options for C-RNTI/MCS-C-RNTI.

A first option is that UE considers one cell as serving cell. The cell may be configured by higher layer signaling, e.g., RRC or MAC CE, or predefined (cell with lowest PCI or cell associated with CORESET with lowest ID or cell associated with CORESETPoolIndex equal to zero). UE should apply the C-RNTI/MCS-C-RNTI associated with the cell for communication.

A second option is that a UE considers all the cells as serving cells. For signals associated with each cell, UE applies corresponding C-RNTI/MCS-C-RNTI.

In another embodiment, C-RNTI/MCS-C-RNTI can be configured per CORESETPoolIndex.

Figure 8:
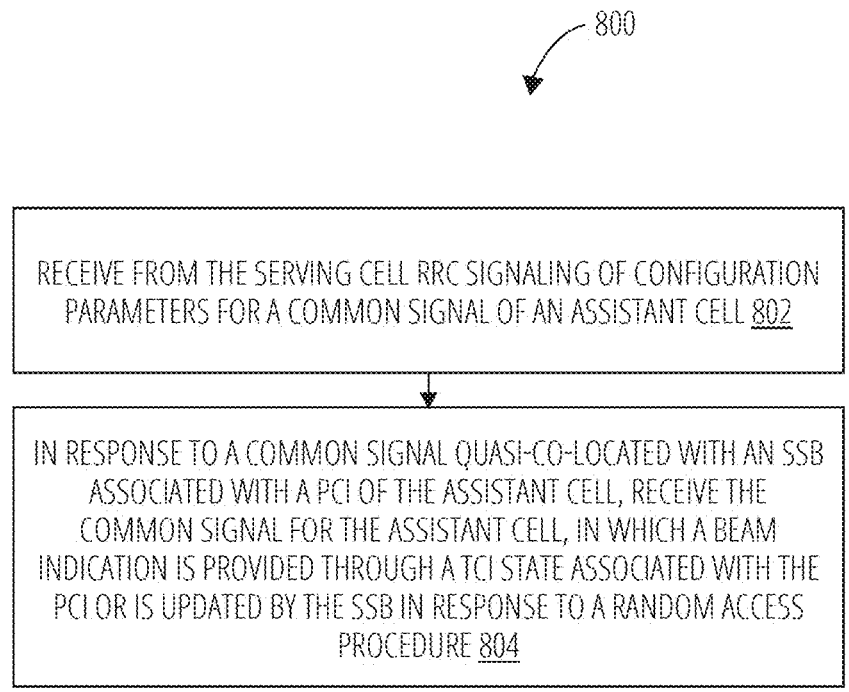
FIG. 8 is a flow diagram of a process, in accordance with one embodiment.

FIG. 8 shows a processes 800 performed by a UE, of obtaining a beam indication for common signals transmitted and scheduled by CSS for inter-cell multi-TRP operation with a change of a serving cell. In block 802, process 800 receives from the serving cell RRC signaling of configuration parameters for a common signal of an assistant cell. In block 804, process 800 in response to a common signal quasi-co-located with an SSB associated with a PCI of the assistant cell, receives the common signal for the assistant cell, in which a beam indication is provided through a TCI state associated with the PCI or is updated by the SSB in response to a random access procedure. Process 800 may also include performing radio resource management measurement events based on a new cell corresponding to the PCI. Process 800 may also include performing radio resource management measurement events based on a cell determined by higher layer signaling. Process 800 may also include performing radio resource management measurement events based on a cell determined by a predefined value of PCI or CORESET ID. Process 800 may also include performing radio resource management measurement events based a function of measurement results from all cells acting as serving cells. Process 800 may also include performing radio resource management measurement events based on per CORESETPoolIndex. Process 800 may also include applying a C-RNTI or MCS-C-RNTI to a new cell corresponding to the assistant cell, in which the C-RNTI or MCS-C-RNTI is optionally determined by higher layer signaling, or is a predefined value of PCI or CORESET ID.

Figure 9:
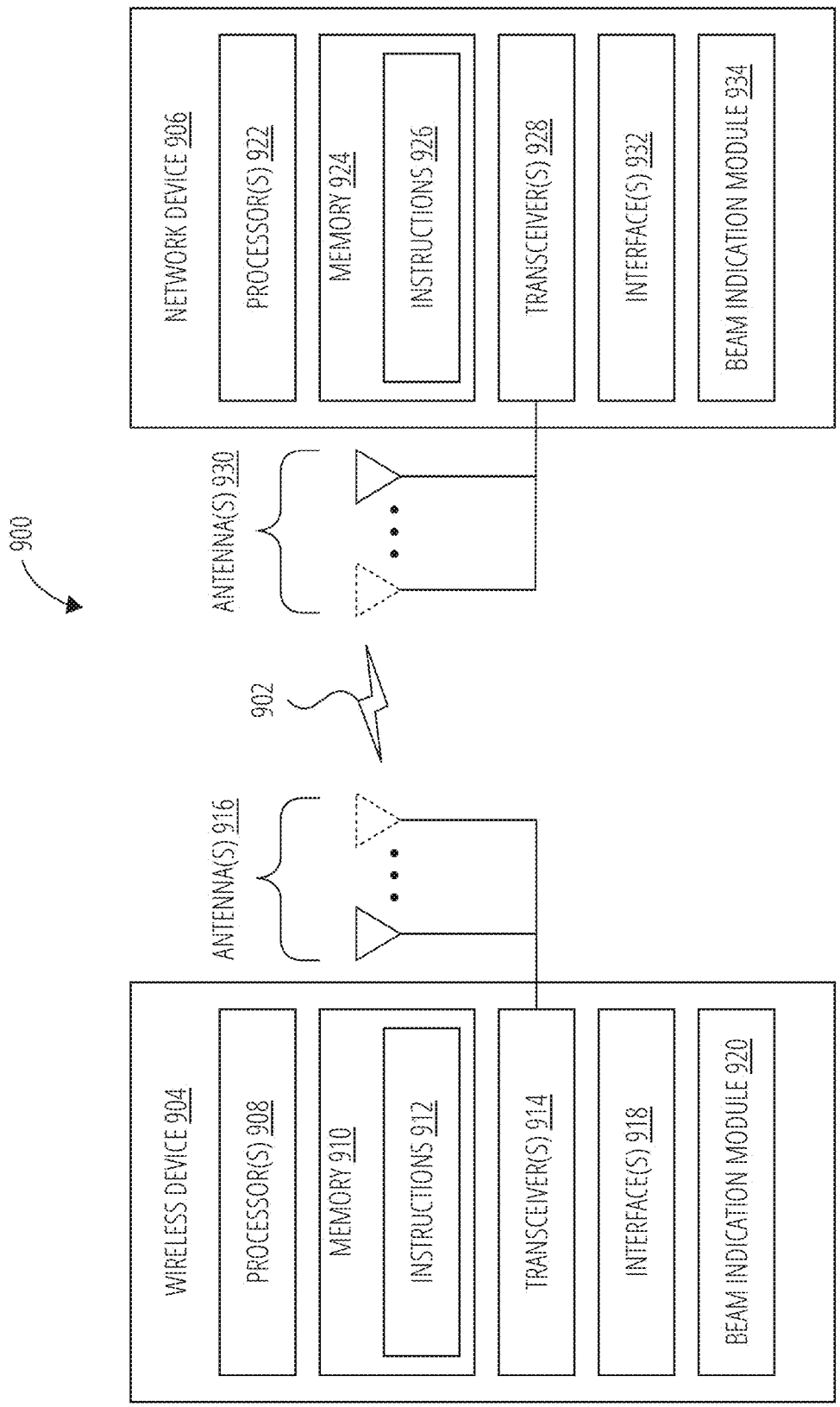
FIG. 9 is a block diagram showing a system for performing signaling between a wireless device and a network device, according to embodiments disclosed herein.

FIG. 9 illustrates a system 900 for performing signaling 902 between a wireless device 904 and a network device 906, according to embodiments disclosed herein. System 900 may be a portion of a wireless communications system as herein described. Wireless device 904 may be, for example, a UE of a wireless communication system. Network device 906 may be, for example, a base station (e.g., an eNB or a gNB) of a wireless communication system.

Wireless device 904 may include one or more processor(s) 908. Processor(s) 908 may execute instructions such that various operations of wireless device 904 are performed, as described herein. Processor(s) 908 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

Wireless device 904 may include a memory 910. Memory 910 may be a non-transitory computer-readable storage medium that stores instructions 912 (which may include, for example, the instructions being executed by processor(s) 908). Instructions 912 may also be referred to as program code or a computer program. Memory 910 may also store data used by, and results computed by, processor(s) 908.

Wireless device 904 may include one or more transceiver(s) 914 that may include radio frequency (RF) transmitter and/or receiver circuitry that use antenna(s) 916 of wireless device 904 to facilitate signaling (e.g., signaling 902) to and/or from wireless device 904 with other devices (e.g., network device 906) according to corresponding RATs.

Wireless device 904 may include one or more antenna(s) 916 (e.g., one, two, four, or more). For embodiments with multiple antenna(s) 916, wireless device 904 may leverage the spatial diversity of such multiple antenna(s) 916 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by wireless device 904 may be accomplished according to precoding (or digital beamforming) that is applied at wireless device 904 that multiplexes the data streams across antenna(s) 916 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, wireless device 904 may implement analog beamforming techniques, whereby phases of the signals sent by antenna(s) 916 are relatively adjusted such that the (joint) transmission of antenna(s) 916 can be directed (this is sometimes referred to as beam steering).

Wireless device 904 may include one or more interface(s) 918. Interface(s) 918 may be used to provide input to or output from wireless device 904. For example, a wireless device 904 that is a UE may include interface(s) 918 such as microphones, speakers, a touchscreen, buttons, and the like in order to allow for input and/or output to the UE by a user of the UE. Other interfaces of such a UE may be made up of made up of transmitters, receivers, and other circuitry (e.g., other than transceiver(s) 914/antenna(s) 916 already described) that allow for communication between the UE and other devices and may operate according to known protocols (e.g., Wi-Fi®, Bluetooth®, and the like).

Wireless device 904 may include a beam indication module 920. Beam indication module 920 may be implemented via hardware, software, or combinations thereof. For example, beam indication module 920 may be implemented as a processor, circuit, and/or instructions 912 stored in memory 910 and executed by processor(s) 908. In some examples, beam indication module 920 may be integrated within processor(s) 908 and/or transceiver(s) 914. For example, beam indication module 920 may be implemented by a combination of software components (e.g., executed by a DSP or a general processor) and hardware components (e.g., logic gates and circuitry) within processor(s) 908 or transceiver(s) 914.

Beam indication module 920 may be used for various aspects of the present disclosure. For example, beam indication module 920 is configured to perform process 800 (FIG. 8).

Network device 906 may include one or more processor(s) 922. Processor(s) 922 may execute instructions such that various operations of network device 906 are performed, as described herein. Processor(s) 908 may include one or more baseband processors implemented using, for example, a CPU, a DSP, an ASIC, a controller, an FPGA device, another hardware device, a firmware device, or any combination thereof configured to perform the operations described herein.

Network device 906 may include a memory 924. Memory 924 may be a non-transitory computer-readable storage medium that stores instructions 926 (which may include, for example, the instructions being executed by processor(s) 922). Instructions 926 may also be referred to as program code or a computer program. Memory 924 may also store data used by, and results computed by, processor(s) 922.

Network device 906 may include one or more transceiver(s) 928 that may include RF transmitter and/or receiver circuitry that use antenna(s) 930 of network device 906 to facilitate signaling (e.g., signaling 902) to and/or from network device 906 with other devices (e.g., wireless device 904) according to corresponding RATs.

Network device 906 may include one or more antenna(s) 930 (e.g., one, two, four, or more). In embodiments having multiple antenna(s) 930, network device 906 may perform MIMO, digital beamforming, analog beamforming, beam steering, etc., as has been described.

Network device 906 may include one or more interface(s) 932. Interface(s) 932 may be used to provide input to or output from network device 906. For example, a network device 906 that is a base station may include interface(s) 932 made up of transmitters, receivers, and other circuitry (e.g., other than transceiver(s) 928/antenna(s) 930 already described) that enables the base station to communicate with other equipment in a core network, and/or that enables the base station to communicate with external networks, computers, databases, and the like for purposes of operations, administration, and maintenance of the base station or other equipment operably connected thereto.

Network device 906 may include a beam indication module 934. Beam indication module 934 may be implemented via hardware, software, or combinations thereof. For example, beam indication module 934 may be implemented as a processor, circuit, and/or instructions 926 stored in memory 924 and executed by processor(s) 922. In some examples, beam indication module 934 may be integrated within processor(s) 922 and/or transceiver(s) 928. For example, beam indication module 934 may be implemented by a combination of software components (e.g., executed by a DSP or a general processor) and hardware components (e.g., logic gates and circuitry) within processor(s) 922 or transceiver(s) 928.

Beam indication module 934 may be used for various aspects of the present disclosure. For example, beam indication module 934 is configured to perform process 400 (FIG. 4).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a base station defining a serving cell, of providing to a user equipment (UE) a beam indication for common signals transmitted and scheduled by common search space (CSS) for inter-cell multiple transmission and reception (multi-TRP) operation without a change of the serving cell, the method comprising:
   quasi-co-locating a common signal with a system synchronization block (SSB) associated with a physical cell ID (PCI) of the serving cell;
   dividing control resource sets (CORESETs) into a first group and a second group, the first group being associated with at least some of the CSS and a transmission configuration indicator (TCI) state associated with the PCI of the serving cell is used for beam indication, the second group being associated with a UE specific search space (USS) and a TCI state associated with a PCI of the serving cell or an assistant cell is used for beam indication,
   in which the first group includes type 0, type 0A, type 1, or type 2 CSS, and wherein a TCI indication is not applied for the type 0, type 0A, type 1, or type 2 CSS; and
   scheduling a physical downlink shared channel (PDSCH) by a CORESET in the first group.

2. The method of claim 1, in which the first group includes all types of CSS.

3. The method of claim 1 further comprising, in response to the UE sending to the base station a physical random access channel (PRACH) associated with the SSB, updating a quasi-co-location for the first group.

4. The method of claim 1, in which the second group includes a type 3 CSS.

5. The method of claim 1, in which the first group includes only CORESET 0.

6. The method of claim 1, in which the PDSCH is scheduled by a physical downlink control channel (PDCCH) in CORESETs in the first or second groups and shares a same beam with CORESETs in the first or second groups.

7. The method of claim 1, further comprising, in response to the UE switching from intra-cell multi-TRP to inter-cell multi-TRP, associating a CORESETPoolIndex with the PCI of the serving cell.

8. A non-transitory computer-readable storage medium of a base station for configuring the base station to provide to a user equipment (UE) a beam indication for common signals transmitted and scheduled by common search space (CSS) for inter-cell multiple transmission and reception (multi-TRP) operation without a change of a serving cell that is defined by the base station, the computer-readable storage medium including instructions that when executed by a processor of the base station, cause the base station to:
   quasi-co-locate a common signal with a system synchronization block (SSB) associated with a physical cell ID (PCI) of the serving cell;
   divide control resource sets (CORESETs) into a first group and a second group, the first group being associated with at least some of the CSS and a transmission configuration indicator (TCI) state associated with the PCI of the serving cell is used for beam indication, the second group being associated with a UE specific search space (USS) and a TCI state associated with a PCI of the serving cell or an assistant cell is used for beam indication, in which the first group includes type 0, type 0A, type 1, or type 2 CSS, and wherein a TCI indication is not applied for the type 0, type 0A, type 1, or type 2 CSS; and schedule a physical downlink shared channel (PDSCH) by a CORESET in the first group.

9. The computer-readable storage medium of claim 8, in which the first group includes all types of CSS.

10. The computer-readable storage medium of claim 8, in which the instructions further cause the base station to, in response to the UE send to the base station a physical random access channel (PRACH) associated with the SSB, update a quasi-co-location for the first group.

11. The computer-readable storage medium of claim 8, in which the second group includes a type 3 CSS.

12. The computer-readable storage medium of claim 8, in which the first group includes only CORESET 0.

13. The computer-readable storage medium of claim 8, in which the PDSCH is scheduled by a physical downlink control channel (PDCCH) in CORESETs in the first or second groups and shares a same beam with CORESETs in the first or second groups.

14. The computer-readable storage medium of claim 8, in which the instructions further cause the base station to, in response to the UE switch from intra-cell multi-TRP to inter-cell multi-TRP, associate a CORESETPoolIndex with the PCI of the serving cell.

* * * * *